United States Patent
Smith et al.

(10) Patent No.: US 10,344,709 B2
(45) Date of Patent: Jul. 9, 2019

(54) SYSTEM AND METHOD FOR REDUCING IDLE THRUST IN A TRANSLATING COWL THRUST REVERSER

(71) Applicant: HONEYWELL INTERNATIONAL INC., Morristown, NJ (US)

(72) Inventors: Danis Burton Smith, Chandler, AZ (US); Shawn Alstad, Peoria, AZ (US); Robert Romano, Tempe, AZ (US); Mark Knowles, Mesa, AZ (US); David Robinson, Arleta, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 869 days.

(21) Appl. No.: 14/850,348

(22) Filed: Sep. 10, 2015

(65) Prior Publication Data
US 2017/0074211 A1    Mar. 16, 2017

(51) Int. Cl.
*F02K 1/60* (2006.01)
*F02K 1/09* (2006.01)
*F02K 1/72* (2006.01)
*F02K 1/76* (2006.01)
*F02K 1/70* (2006.01)

(52) U.S. Cl.
CPC ............ *F02K 1/605* (2013.01); *F02K 1/09* (2013.01); *F02K 1/72* (2013.01); *F02K 1/763* (2013.01); *F02K 1/766* (2013.01); *F02K 1/60* (2013.01); *F02K 1/70* (2013.01); *F05D 2260/50* (2013.01); *F05D 2260/52* (2013.01); *F05D 2260/56* (2013.01)

(58) Field of Classification Search
CPC ..... F02K 1/09; F02K 1/60; F02K 1/70; F02K 1/72; F02K 1/605; F02K 1/763; F02K 1/766
See application file for complete search history.

(56) References Cited

U.S. PATENT DOCUMENTS

| | | | |
|---|---|---|---|
| 3,050,937 A | 8/1962 | James et al. | |
| 3,086,360 A | 4/1963 | Gavin | |
| 3,492,821 A * | 2/1970 | Monaghan | F02K 1/605 239/265.29 |
| 3,497,165 A * | 2/1970 | Bee | F02K 1/72 239/265.29 |
| 3,500,644 A * | 3/1970 | Hom | F02K 1/72 239/265.29 |

(Continued)

FOREIGN PATENT DOCUMENTS

| | | |
|---|---|---|
| DE | 102012002885 A1 | 8/2013 |
| EP | 2607676 A2 | 6/2013 |

(Continued)

OTHER PUBLICATIONS

Webster's Collegiate Thesaurus, published in 1988, p. 133 defininition of "close on".*

(Continued)

*Primary Examiner* — Lorne E Meade
(74) *Attorney, Agent, or Firm* — Lorenz & Kopf, LLP

(57) ABSTRACT

A system and method for reducing idle thrust in a translating cowl reverser system is provided. The provided system and method provide a partial deployment, or thrust reverser system intermediate position for a translating cowl thrust reverser system.

11 Claims, 7 Drawing Sheets

(56) References Cited

U.S. PATENT DOCUMENTS

| | | | | |
|---|---|---|---|---|
| 3,500,645 A | * | 3/1970 | Hom | F02K 1/72 239/265.29 |
| 3,665,709 A | * | 5/1972 | Medawar | F02K 1/72 60/226.2 |
| 3,779,010 A | * | 12/1973 | Chamay | F02K 1/09 239/265.31 |
| 3,829,020 A | * | 8/1974 | Stearns | F02K 1/09 181/216 |
| 3,915,415 A | | 10/1975 | Pazmany | |
| 4,145,877 A | * | 3/1979 | Montgomery | F02K 1/72 60/226.2 |
| 4,278,220 A | * | 7/1981 | Johnston | F02K 1/72 244/110 B |
| 4,340,178 A | | 7/1982 | Lawson | |
| 4,353,516 A | * | 10/1982 | Soligny | F02K 1/60 181/217 |
| 4,410,152 A | * | 10/1983 | Kennedy | F02K 1/563 239/265.27 |
| 4,564,160 A | | 1/1986 | Vermilye | |
| 4,716,724 A | * | 1/1988 | Newton | F02K 1/72 239/265.29 |
| 4,731,991 A | * | 3/1988 | Newton | F02K 1/72 239/265.31 |
| 4,790,495 A | | 12/1988 | Greathouse et al. | |
| 5,507,143 A | * | 4/1996 | Luttgeharm | F02K 1/563 239/265.31 |
| 5,655,360 A | | 8/1997 | Butler | |
| 6,151,885 A | | 11/2000 | Metezeau et al. | |
| 6,311,928 B1 | * | 11/2001 | Presz, Jr. | B64D 33/04 239/265.29 |
| 6,385,964 B2 | * | 5/2002 | Jean | F02K 1/72 239/265.29 |
| 6,926,234 B2 | | 8/2005 | Colotte et al. | |
| 8,104,262 B2 | * | 1/2012 | Marshall | F02K 1/09 239/265.19 |
| 9,163,583 B2 | * | 10/2015 | James | F02K 1/70 |
| 9,447,749 B2 | * | 9/2016 | James | F02K 1/72 |
| 2012/0138707 A1 | | 6/2012 | Vauchel | |

FOREIGN PATENT DOCUMENTS

| | | |
|---|---|---|
| EP | 2660454 A2 | 11/2013 |
| FR | 3006716 A1 | 12/2014 |
| WO | 0157382 A3 | 8/2001 |
| WO | 2014195646 A1 | 12/2014 |

OTHER PUBLICATIONS

Extended EP Search Report for Application No. 16187132.2-1607 dated Feb. 2, 2017.

* cited by examiner

SYSTEM AND METHOD FOR REDUCING IDLE THRUST IN A TRANSLATING COWL THRUST REVERSER

TECHNICAL FIELD

The present invention relates to a thrust reverser system for a turbofan engine, and more particularly to reducing idle thrust in a translating cowl thrust reverser system.

BACKGROUND

When jet-powered aircraft land, the wheel brakes and the imposed aerodynamic drag loads (e.g., flaps, spoilers, etc.) of the aircraft may not be sufficient to achieve the desired stopping distance. Thus, turbofan engines on most jet-powered aircraft include thrust reverser systems. Thrust reverser systems enhance the stopping power of the aircraft by redirecting turbofan engine exhaust airflow in order to generate reverse thrust.

Traditional thrust reverser systems have two distinct operating states: a forward (or stowed) state, wherein the thrust reverser system typically forms a portion a turbofan engine nacelle and forward thrust nozzle; and a reverse (or deployed) state, wherein the thrust reverser system redirects at least a portion of the engine airflow forward and radially outward, to help decelerate the aircraft. The transition between the forward to the reverse state is typically achieved by translating a portion of the nacelle aft. The translating portion of the nacelle is often referred to as the translating cowl, or transcowl, and translating the transcowl aft creates an aperture in the nacelle. Internally, blocker doors are typically deployed synchronously with the translation of the transcowl aft. The blocker doors obstruct forward thrust and generate reverse thrust that discharges through the aperture.

During some phases of flight, it is desired that the engine produce as little forward thrust as possible. For example, during descent the turbofan engine power setting is typically reduced to its minimum thrust setting, often referred to as the "idle" state or the idle power setting. Ideally, the engine should produce zero forward thrust at this idle state, so as to achieve the maximum possible rate of aircraft descent. In practice, the engine still produces a residual amount of forward thrust in the idle state. This residual forward thrust prevents the aircraft from achieving the maximum rate of descent. Consequently, reducing the residual forward or idle thrust during descent is desirable in order to achieve higher rates of descent. Similarly, the engine power setting is typically reduced to idle during a ground taxi. The residual forward or idle thrust may cause the aircraft to accelerate or taxi at a higher rate than is desirable, requiring considerable effort from the pilot in order to maintain a desirable taxi speed.

Accordingly, a system and method for reducing idle thrust in a translating cowl reverser system is desirable. The desired system and method provide a partial deployment, or thrust reverser system intermediate position for a translating cowl thrust reverser system.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A thrust reverser system for a turbofan engine is provided. The thrust reverser system comprises:
  a stationary structure configured to be mounted to the turbofan engine;
  a transcowl mounted on the stationary structure and comprising a front edge, the transcowl configured for movement between a first position, in which the front edge abuts the stationary structure, and a second position, in which the transcowl is translated aft, thereby creating an aperture between the front edge and the stationary structure;
  a first displaceable blocker door pivotally mounted to the stationary structure and at least partially surrounded by the transcowl, the first displaceable blocker door rotatable about a pivot axis and configured for pivoting between a stowed position and a deployed position, the first displaceable blocker door configured, when it is in the deployed position, to direct engine airflow to discharge through the aperture to thereby generate reverse thrust;
  an actuation system coupled to the transcowl and the first displaceable blocker door, the actuation system configured to coordinate transcowl movement with pivoting of the first displaceable blocker door, thereby creating
    (i) a forward position, in which the transcowl is in the first position and the first displaceable blocker door is in the stowed position,
    (ii) a reverse position, in which (a) the transcowl is in the second position and (b) the first displaceable blocker door is in the deployed position, and
    (iii) an intermediate position, in which (a) the transcowl is positioned at a predetermined distance between the first and second positions, thereby creating a reduced aperture through which a portion of engine airflow discharges, and (b) the first displaceable blocker door is in the stowed position.

Another thrust reverser system for a turbofan engine is provided, comprising:
  a stationary structure configured to be mounted to the turbofan engine;
  a transcowl mounted on the stationary structure and comprising a front edge, the transcowl configured for movement between a first position, in which the front edge abuts the stationary structure, and a second position, in which the transcowl is translated aft, thereby creating an aperture between the front edge and the stationary structure;
  a first displaceable blocker door pivotally mounted to the stationary structure and at least partially surrounded by the transcowl, the first displaceable blocker door rotatable about a pivot axis and configured for pivoting between a stowed position and a deployed position, the first displaceable blocker door configured, when it is in the deployed position, to direct engine airflow to discharge through the aperture to thereby generate reverse thrust, wherein
    the first displaceable blocker door is one of a plurality of displaceable blocker doors, and each of the plurality of displaceable blocker doors is pivotally mounted to the stationary structure and at least partially surrounded by the transcowl;
    each of the plurality of displaceable blocker doors is rotatable about the pivot axis and configured to be pivoted between a stowed position and a deployed position when the transcowl moves between the first position and the second position, respectively; and each of the plurality of displaceable blocker doors is configured, when it is in the deployed position, to redirect engine airflow through the aperture to thereby generate reverse thrust; and an actuation system coupled to the transcowl and the plurality of displaceable blocker doors, the actuation system configured to coordinate transcowl movement with pivoting of the plurality of displaceable blocker doors, thereby creating (i) a forward position, in which the transcowl is in the first position and the plurality of displaceable blocker doors is in the stowed position, (ii) a reverse position, in which (a) the transcowl is in the second position and (b) the plurality of displaceable blocker doors is in the deployed position, (iii) an intermediate position, in which (a) the transcowl is positioned at a predetermined distance between the first and second position, thereby creating a reduced aperture through which a portion of engine airflow discharges, and (b) the plurality of displaceable blocker doors is in the stowed position.

A method for producing a thrust reverser system for a turbofan engine is provided, comprising:

mounting a stationary structure to the turbofan engine;

mounting a transcowl on the stationary structure;

pivotally mounting a first displaceable blocker door to the stationary structure, wherein the first displaceable blocker door is rotatable about a pivot axis and configured for pivoting between a stowed position and a deployed position;

coupling an actuation system to the transcowl and the first displaceable blocker door;

coordinating, by the actuation system, transcowl movement with pivoting of the first displaceable blocker door, thereby creating (i) a forward position, in which the transcowl is abutted with the stationary structure and the first displaceable blocker door is in the stowed position, (ii) a reverse position, in which (a) the transcowl is translated aft from the stationary structure, creating an aperture, and (b) the first displaceable blocker door is in the deployed position, (iii) an intermediate position, in which (a) the transcowl is translated aft from the stationary structure by a predetermined distance, thereby creating a reduced aperture through which a portion of engine airflow discharges, and (b) the first displaceable blocker door is in the stowed position.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments.

The turbofan engine is a component of an aircraft's propulsion system that, in cooperation with the thrust reverser, generates thrust by means of an accelerating mass of gas. As an overview, when the thrust reverser is in the forward thrust state with one or more displaceable blocker doors stowed, engine airflow moves from the forward end of the turbofan engine to the aft end and is discharged as forward thrust. Alternatively, when the thrust reverser is in the reverse thrust state the displaceable blocker doors are deployed, the engine airflow is prevented from being discharged as forward thrust, and is instead discharged through an aperture, generating reverse thrust.

Various embodiments are directed to a thrust reverser system that is suitable for an aircraft turbofan engine and provides reduced idle thrust. As will be apparent from the detail below, the exemplary embodiments advantageously provide a reduction in idle thrust as compared to traditional thrust reverser designs. The embodiments described below are merely examples and serve as a guide for implementing the novel systems and methods herein on any industrial, commercial, military, or consumer turbofan application. As such, the examples presented herein are intended as non-limiting.

Figure 1:
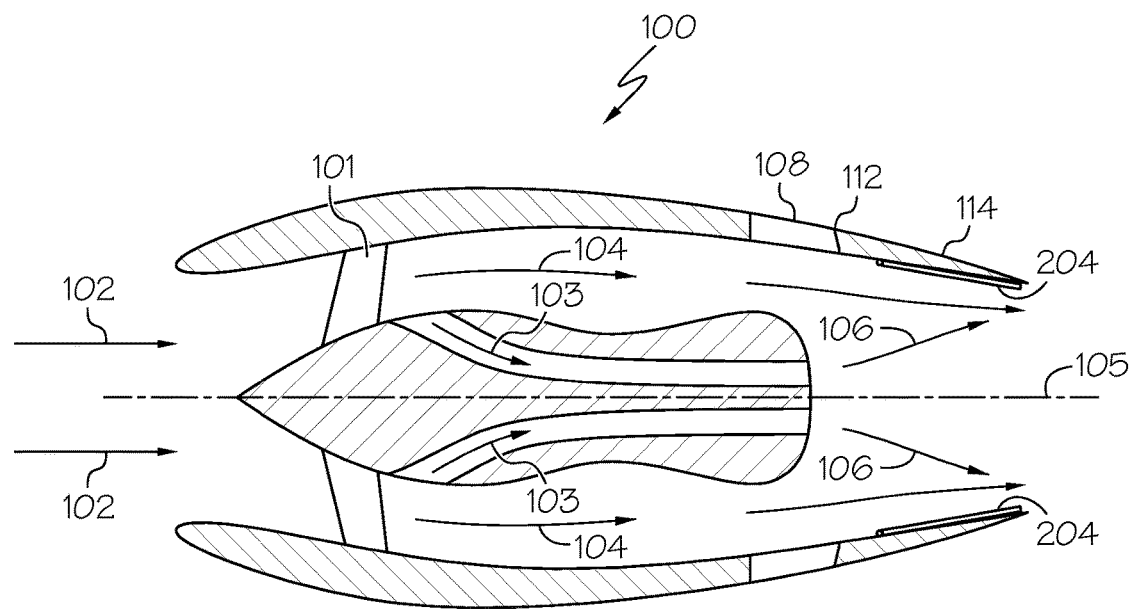
FIG. 1-FIG. 2 are perspective views of a typical aircraft turbofan engine with (i) a thrust reverser in a stowed position (FIG. 1), (ii) a thrust reverser in a deployed position (FIG. 2)

Turning now to FIG. 1, a turbofan engine is substantially encased within an aerodynamically smooth outer covering, the nacelle 100. Nacelle 100 wraps around the turbofan engine and forms an aerodynamically shaped cavity around an engine centerline 105, thereby providing an engine exhaust flow 106 when the aircraft is generating forward thrust. Ambient air 102 enters the turbofan engine and passes through a fan 101. A portion of this air will be pressurized, mixed with fuel and ignited, generating hot gasses known as core flow 103. The remainder of this air bypasses the engine core and is known as fan flow 104. Together, fan flow and core flow become the engine exhaust flow 106 that is discharged, generating forward thrust.

Nacelle 100 comprises a thrust reverser with stationary structure 108 and an annular translatable cowl, or transcowl 114. Transcowl 114 is mounted adjacent to the stationary structure 108 and extends aft therefrom. In a forward thrust position of a typical thrust reverser system, a front edge 112 of the transcowl 114 abuts with the stationary structure 108, creating a substantially smooth and continuous cavity for the fan flow 104 and exhaust flow 106, thereby generating forward thrust.

One or more support beams (FIG. 3, support beam 210) may extend aft from the stationary structure 108 and slidably engage with transcowl 114. The stationary structure has an annular shape and typically includes associated support beams to provide a rigid annular structure to which moveable thrust reverser components (described in detail below) may be mounted. The stationary structure 108 also serves to mount the entire thrust reverser system to the turbofan engine.

Figure 2:
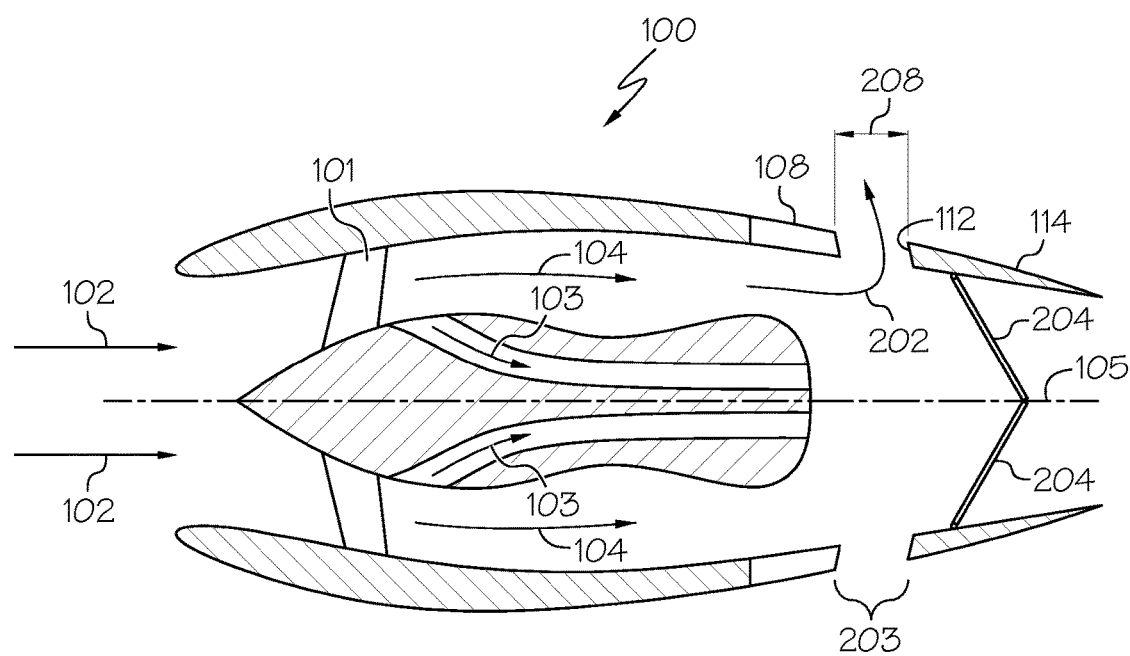

Turning next to FIG. 2, a typical thrust reverser transitions to the reverser thrust position by translating transcowl 114 aft from the stationary structure 108 by a predetermined distance 208, creating a reverse flow aperture 203. Concurrently with the transcowl movement, displaceable blocker doors 204 pivot to obstruct the fan flow 104 or exhaust flow 106. This coordinated motion of the transcowl 114 and displaceable blocker doors 204 creates a reverse flow path 202, thereby generating reverse thrust. In a typical thrust reverser system, the transition from the forward thrust position to the reverser thrust position occurs as a single, continuous motion, wherein no intermediate or partially deploy position is sustained. As will be seen in the following sections, the present invention introduces a thrust reverser design that enables an intermediate operating state, wherein forward thrust produced by the engine can be reduced to a level lower than is possible on a typical thrust reverser system.

Figure 3:
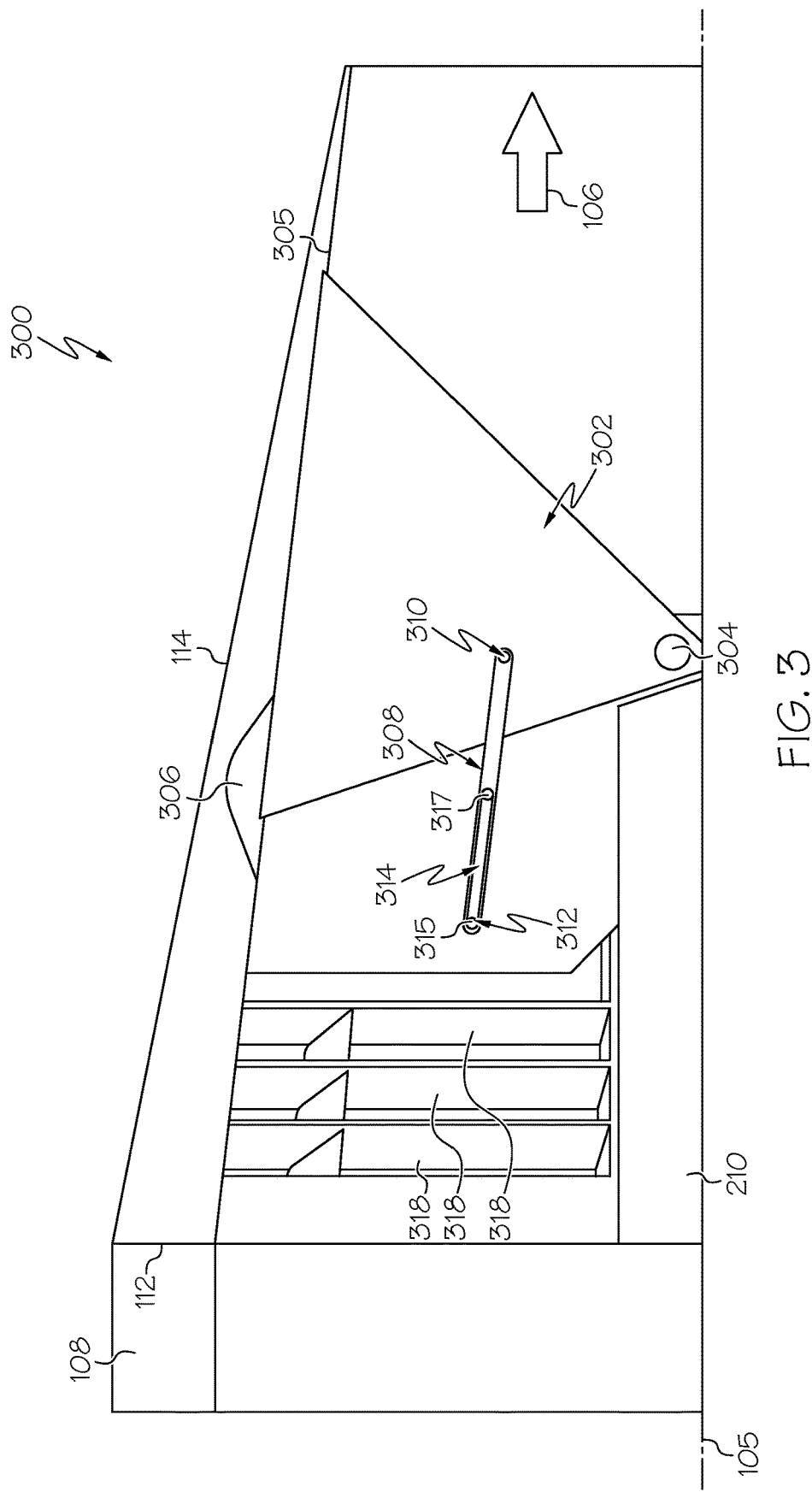
FIG. 3 is a partial cross sectional view, above a thrust reverser centerline, of a thrust reverser system in a forward (stowed) position, according to an exemplary embodiment.
Figure 4:
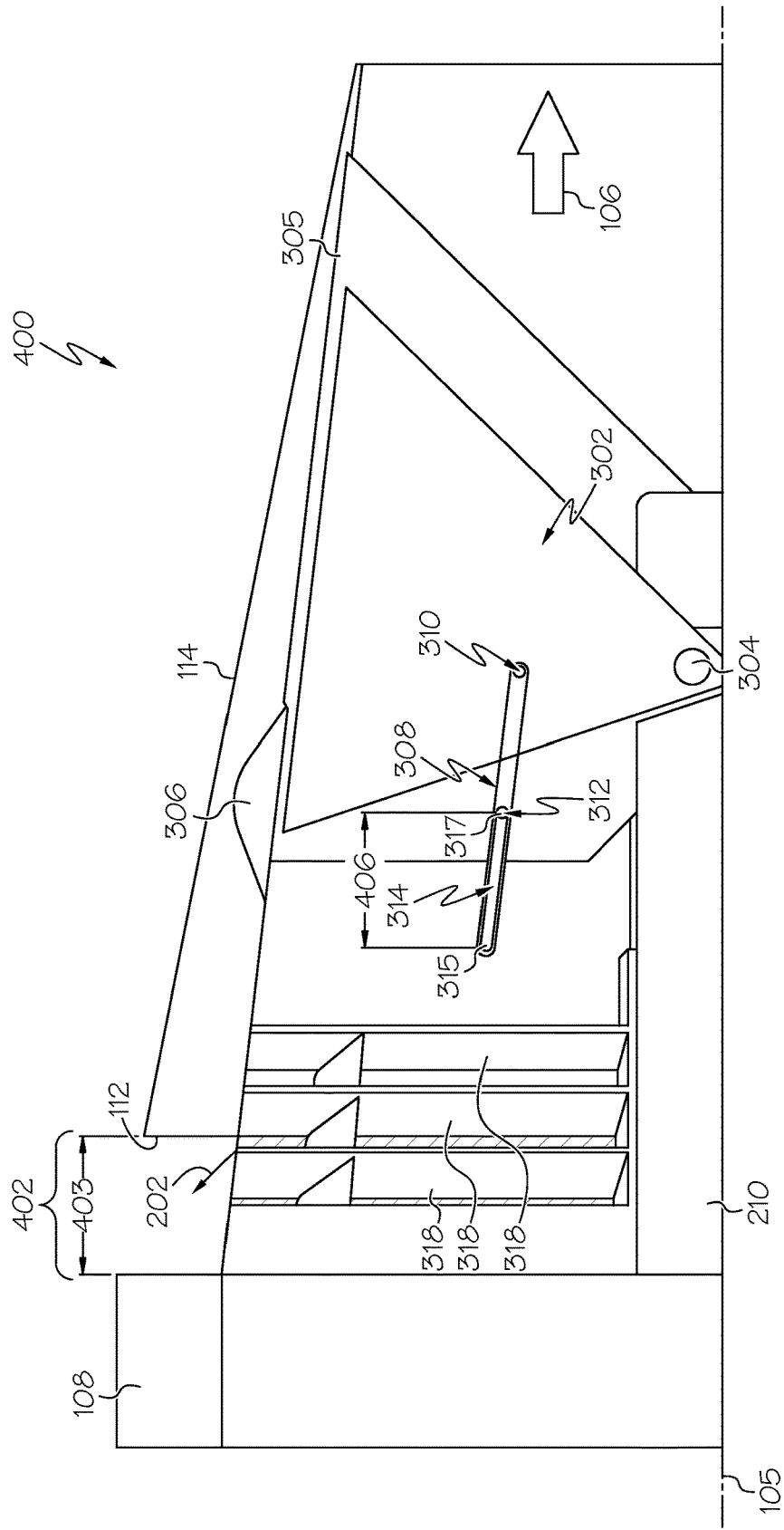
FIG. 4 is a partial cross sectional view of the thrust reverser system in FIG. 3 in an intermediate position, according to the exemplary embodiment.
Figure 5:
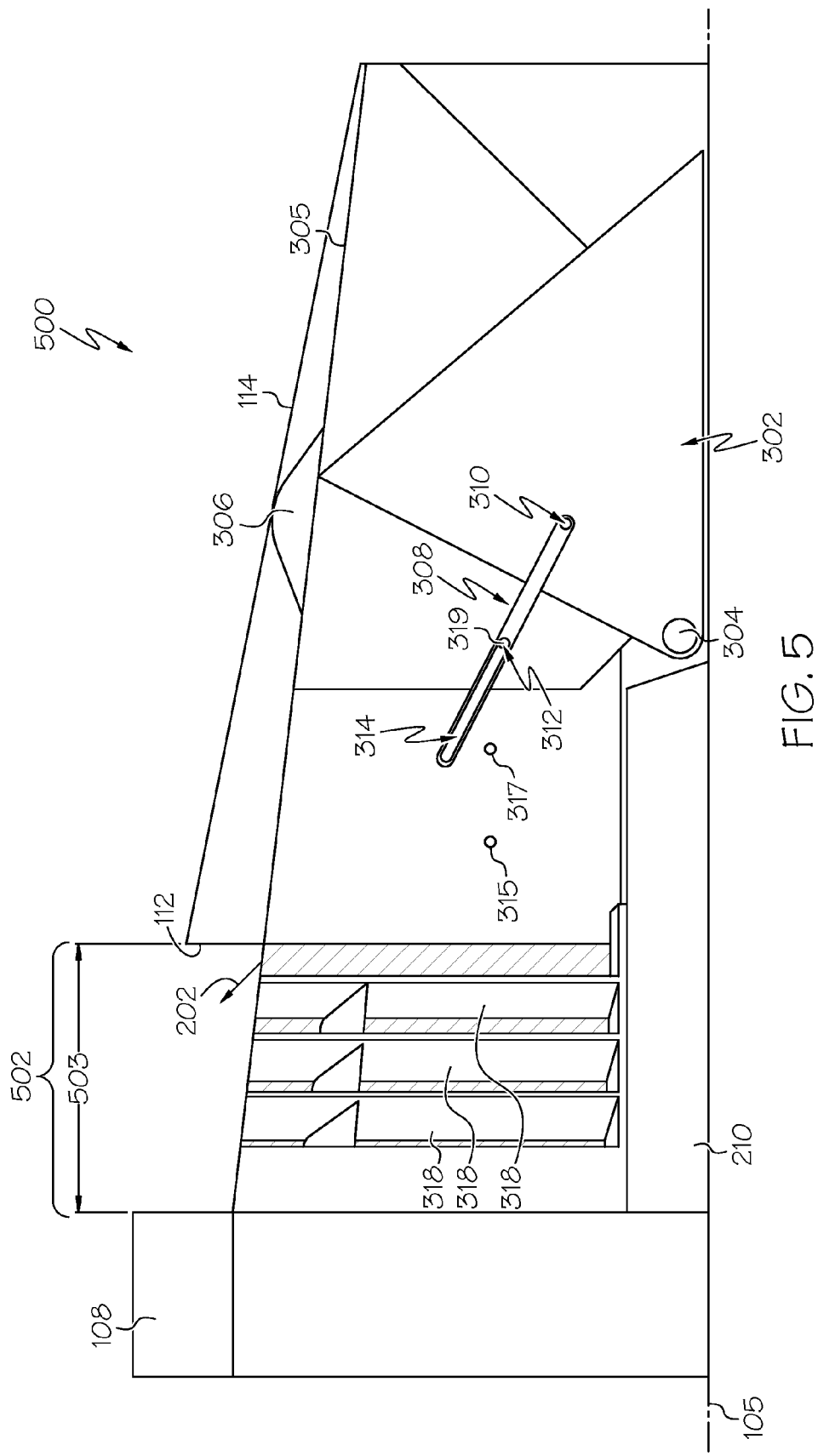
FIG. 5 is a partial cross sectional view of the thrust reverser system in FIG. 3 in a reverse (deployed) position, according to the exemplary embodiment.

Each of FIGS. 3-5 provide a partial cross sectional view of a top half of a thrust reverser system in accordance with an exemplary embodiment, depicting three provided thrust reverser system positions. FIG. 3 is a partial cross sectional view 300 of a thrust reverser system in a forward position; FIG. 4 provides the thrust reverser system of FIG. 3 in an intermediate position; and, FIG. 5 provides the thrust reverser system of FIG. 3 in a reverse position. An engine centerline 105 is depicted for reference. Each thrust reverser system position is described further hereinbelow.

FIG. 3 is a partial cross sectional view 300, above an engine centerline 105, of a thrust reverser system in a forward (stowed) position, according to an exemplary embodiment. In FIG. 3, the front edge 112 of transcowl 114 abuts circumferentially with the annular stationary structure 108. A displaceable blocker door 302 is shown pivotally attached at pivot joint 304.

Displaceable blocker door 302 is pivotally mounted to support beam 210 at pivot joint 304; pivot joint 304 provides a pivot axis for displaceable blocker door 302 to pivot about. In FIG. 3, displaceable blocker door 302 is shown stowed thereby being substantially continuous with an inner surface 305 of transcowl 114. As the displaceable blocker door 302 pivots about the pivot axis, it traces out a path on an inner surface 305 of the transcowl 114 that the inner surface 305 is modified to accommodate. In the embodiment, inner surface 305 is shaped with a contoured area 306 to provide clearance of displaceable blocker door 302 as it pivots on its pivot axis. Pivot joint 304 may be any fastener or fastening assembly capable of enabling the displaceable blocker door 302 to pivot as described while meeting all attending design requirements.

As one with skill in the art will appreciate, various embodiments of pivotally mounted displaceable blocker doors 302 are supported. Although the cross sectional view of FIG. 3 may make displaceable blocker door 302 appear to be two-dimensional; in practice it may be three-dimensional, for example, having a clamshell shape. Displaceable blocker door 302 is machined or manufactured to have a shape that permits it to be substantially continuous with the inner surface 305 while stowed, minimizing interference with turbofan engine airflow (fan flow 104 and/or exhaust flow 106).

An actuation system is coupled to the transcowl 114 so as to achieve coordinated motion of the transcowl 114 and the displaceable blocker door 302. In the embodiment, the actuation system includes a linkage rod 308 comprising a first end and a second end, the second end having a slot 314 therethrough. A first fastener 310 couples the linkage rod 308 on the first end to the first displaceable blocker door 302. The linkage rod 308 is coupled on the second end to the transcowl 114 by a second fastener 312. Cascade-type thrust reverser features, such as a plurality of cascade vanes 318, may be present (cascade vanes 318 are described in more detail in connection with FIGS. 4 and 5).

One with skill in the art will readily appreciate that the actuation system may comprise additional components that are not the subject of the present invention. Additional components within the actuation system may be utilized to cause the transcowl 114 to translate back and forth between the stowed (forward) position, the intermediate position, and the deployed (reverse) position. The actuation system may comprise mechanical and/or electrical components, and may be responsive to aircraft system commands.

FIG. 4 is a partial cross sectional view 400 of the thrust reverser system in FIG. 3 in an intermediate position, according to the exemplary embodiment. When transcowl 114 is moved aft of the stationary structure 108, the front edge 112 of transcowl 114 creates an aperture 402 that is bounded on one side by front edge 112. In the embodiment, the front edge 112 of transcowl 114 is positioned a predetermined distance 403 from the stationary structure 108. FIG. 4 is not to scale, however, a person with skill in the art will readily appreciate that predetermined distance 403 is less than a total deployment position, (total distance 503 aft of stationary structure 108 in FIG. 5) achieved when the thrust reverser system is in the reverse position. The reverse position of the thrust reverser system is described in more detail in connection with FIG. 5.

Moving transcowl 114 aft, as illustrated, results in discharging a portion of fan flow 104 through aperture 402, creating an reverse flow path 202, reducing the amount of flow passing through exhaust flow 106; thereby reducing the amount of forward thrust generated. Notably, displaceable blocker door 302 remains in its stowed or forward thrust position, and does not obstruct fan flow 104 or exhaust flow 106. The provided intermediate position is achieved as second fastener 312 travels a distance 406 within the slot 314, from a starting point 315 to a point 317, without causing or permitting the displaceable blocker door 302 to pivot away from the stowed position. This relative motion between the transcowl 114 and the displaceable blocker door 302, achieved by the motion of second fastener 312 within slot 314, is sometimes referred to as asynchronous or "lost motion."

The provided lost motion advantageously yields a thrust reverser system having an intermediate position that may be referred to as "partially deployed." In practice, the exemplary thrust reverser system could be placed in this intermediate position during descent and approach, so as to increase the aircrafts rate of descent. Increasing the aircraft rate of descent permits the aircraft to make altitude changes more quickly, thereby reducing the amount of time necessary to complete the decent and approach phase of flight. During landing, the thrust reverser system could be moved to the fully deployed position, thereby creating reverse thrust to decelerate the aircraft. Finally, after the completion of the landing phase, the exemplary thrust reverser system could be put back into the intermediate position, with displaceable blocker doors 302 pivoted back to their stowed position during ground taxi. Applied this way, the partial deployment permits engine airflow to essentially leak out of the aperture 402, thereby reducing the forward thrust generated by exhaust flow 106. An objective of this partial deployment is to achieve an at least 10% reduction in net forward thrust, without producing any net reverse thrust. The corresponding desired partial deployment may be defined as a translation (aft) of the transcowl 114 a predetermined distance that ranges from about 25% to about 75% of its total deployment position.

A plurality of cascade vanes 318, used to redirect thrust, may be disposed within aperture 402 in some embodiments. The cascade vanes 318 are shaped and oriented to direct turbofan engine fan flow 104 through the aperture 402. The number, position, size, material, etc., of the cascade vanes 318 are dependent upon the individual thrust reverser system design.

FIG. 5 is a partial cross sectional view of the thrust reverser system in FIG. 3 in a reverse or fully deployed position, according to the exemplary embodiment. The provided reverse position achieves full deployment of the exemplary thrust reverser system. The reverse position is achieved as the continued motion of the transcowl 114 causes the second fastener 312 to travel from point 317 to ending point 319, reaching the end of slot 314 and causing the linkage rod 308 and its fastener 310 to move aft. The motion of the linkage rod 308 and fastener 310 causes the displaceable blocker door 302 to pivot from the stowed position into the deployed position. The movement of the transcowl 114 and the deployment of the displaceable blocker door 302 are synchronous between the intermediate position and the reverse position. As described above, moving transcowl 114 aft of the stationary structure 108 creates or exposes an aperture 502 that is bounded on one side by front edge 112. In FIG. 5, transcowl 114 has been moved to its total deployment position, total distance 503 aft of stationary structure 108, creating aperture 502.

Displaceable blocker door 302 is machined or manufactured to have a shape that permits it to obstruct exhaust flow 106 and redirect it forward when displaceable blocker door 302 is in its deployed position; thereby generating reverse thrust. In FIG. 5, displaceable blocker door 302 can be seen to have deployed; it has moved to obstruct exhaust flow 106, redirecting it through aperture 502. In the reverse position, the exemplary embodiment generates a net thrust in the reverse thrust direction.

Figure 6:
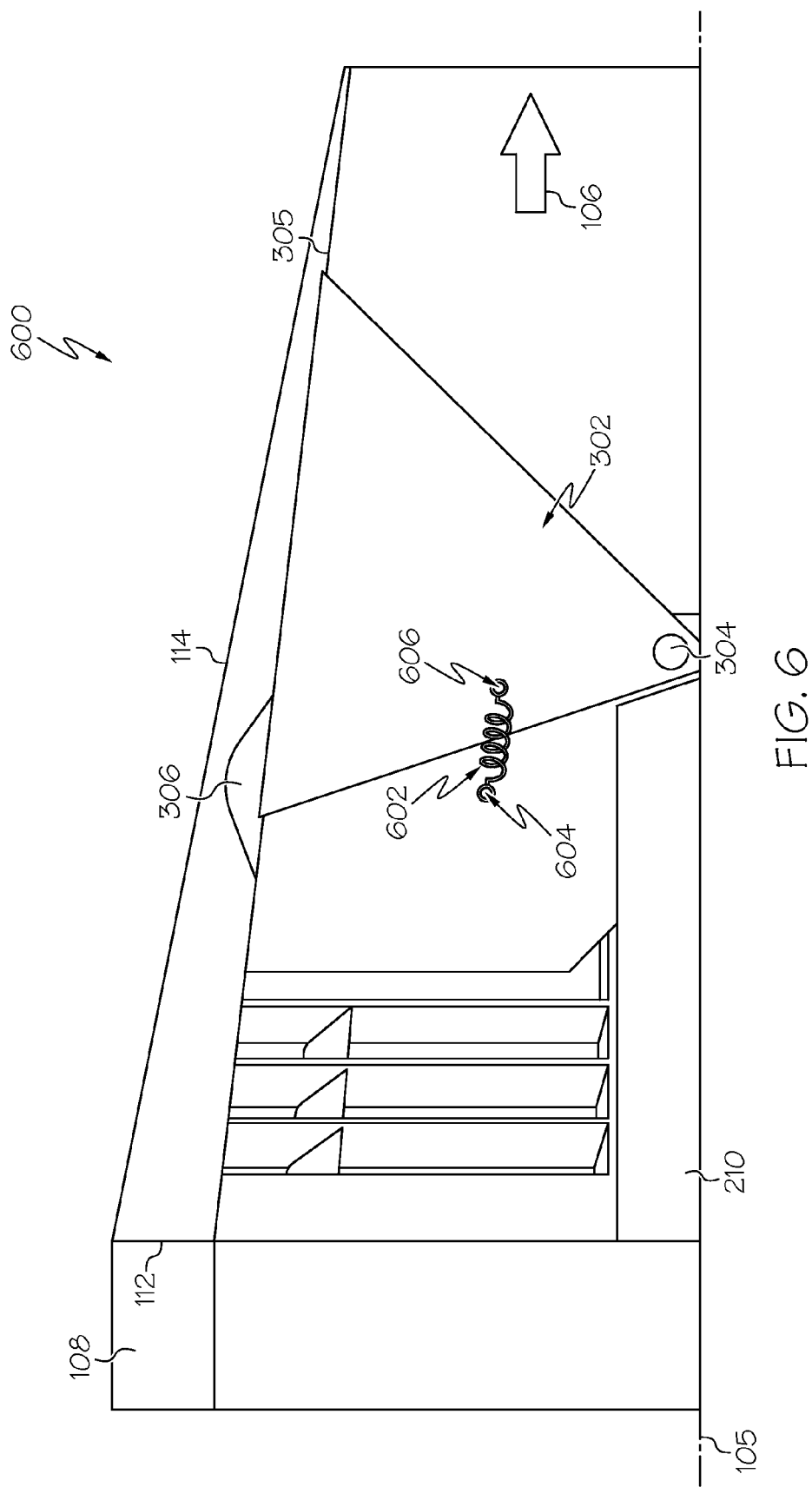
FIG. 6 is a partial cross sectional view, above a thrust reverser centerline, of a thrust reverser system in a forward (stowed) position, according to another exemplary embodiment.
Figure 7:
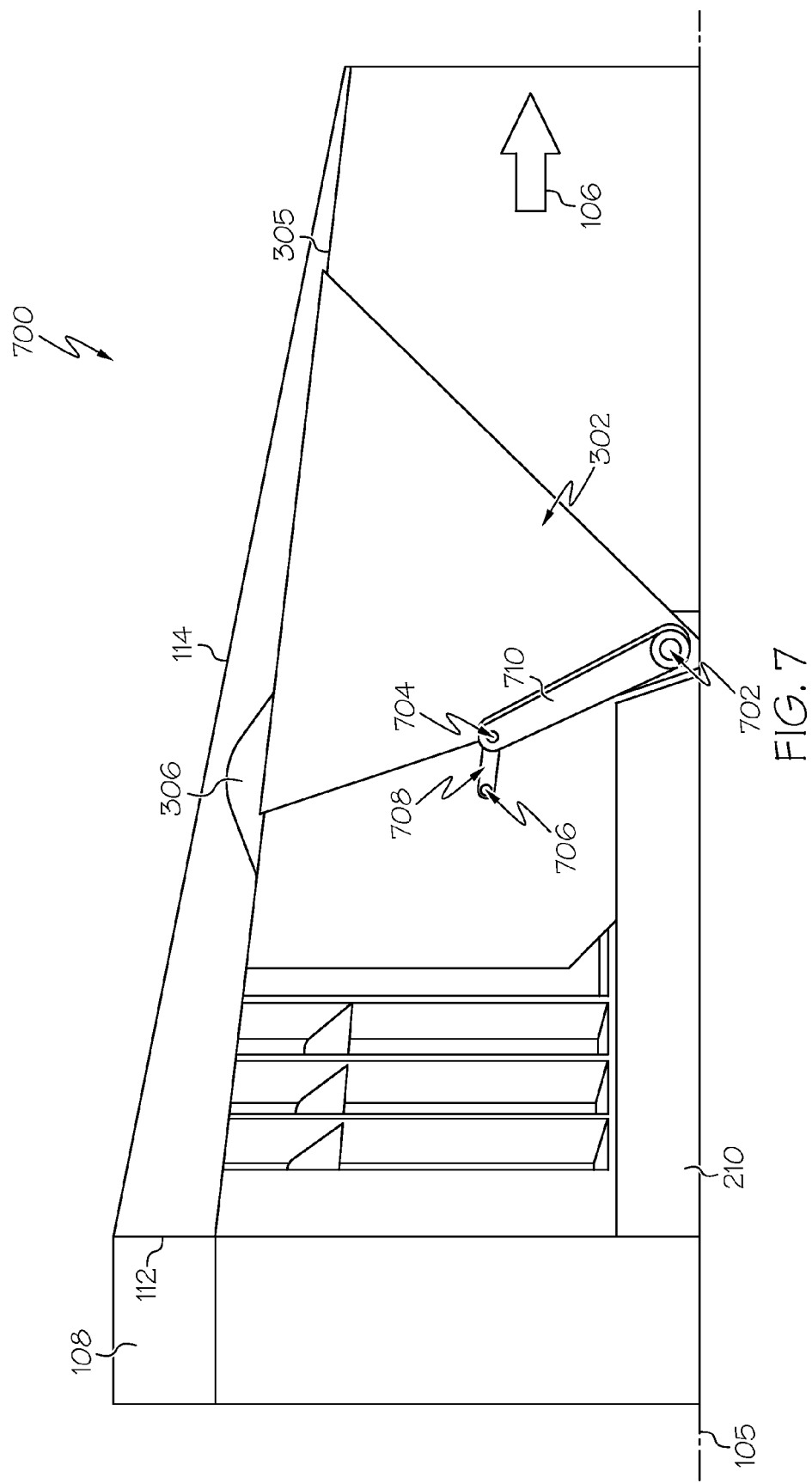
FIG. 7 is a partial cross sectional view, above a thrust reverser centerline, of a thrust reverser system in a forward (stowed) position, according to yet another exemplary embodiment.

FIG. 6 and FIG. 7 are partial cross sectional views, above an engine centerline 105, of a thrust reverser system in a forward (stowed) position, providing additional embodiments. In FIG. 6, the partial cross sectional view 600 depicts the actuation system comprising a flexible member 602 instead of the above described linkage rod 308. In FIG. 7, the partial cross sectional view 700 depicts the actuation system comprising a rod 708 and lever arm 710 instead of the above described linkage rod 308. Each embodiment is addressed further below.

In FIG. 6, flexible member 602 is coupled on a first end to the first displaceable blocker door 302 with first fastener 606 and coupled on a second end to the transcowl 114 with second fastener 604. As transcowl 114 translates aft from its stowed or forward position to its intermediate or partially deployed position, the flexible member 602 exerts an elastic force on displaceable blocker door 302, this force having a magnitude below a predefined threshold. Consequently, displaceable blocker door 302 does not rotate, being held in the stowed position by a bias force equal to the predefined threshold. As transcowl 114 translates further aft from its intermediate position to its reverse or fully deployed position, the flexible member 602 exerts an elastic force on displaceable blocker door 302 that exceeds the predefined threshold. Consequently, displaceable blocker door 302 rotates to the fully deployed position. In the embodiment, the flexible member 602 could take the form of a compression spring or any other elastic element that is manufactured or designed to exert an elastic force on the displaceable blocker door 302 that increases with increasing translation of transcowl 114. This elastic force, in combination with the afore mentioned bias force, provides motion of the transcowl 114 and displaceable blocker door 302 that is initially asynchronous, but is later synchronous, providing a "lost motion" behavior that is analogous to the behavior that the above described linkage rod embodiment (FIGS. 3-5) provides, thereby providing the thrust reverser system intermediate position.

In FIG. 7, the actuation system comprises a rod 708 and a lever arm 710. The rod 708 comprises a first end and a second end, and is coupled on the first end, via fastener 706, to the transcowl 114. The lever arm 710 is coupled on the first end to the second end of the rod 708, via fastener 704, and coupled on the second end to the first displaceable blocker door 302, via fastener 702. The attachment between the lever arm 710 and the displaceable blocker door 302 includes a "lost motion" feature, such as a slot or an elongated keyway. As transcowl 114 translates aft from its stowed or forward position to its intermediate or partially deployed position it causes rod 708 to move, thereby causing lever arm 710 to rotate. However, during this first phase of motion the displaceable blocker door 302 does not rotate, such relative motion being permitted by the lost motion feature in the lever arm. However, as transcowl 114 translates further aft from its intermediate position to its reverse or fully deployed position, lever arm 710 exceeds the limits of its lost motion feature and causes displaceable blocker door 302 to rotate to the fully deployed position. In the embodiment, the rod 708 and lever arm are manufactured and/or designed to provide the initially asynchronous and later synchronous behavior that the above described linkage rod embodiment provides, thereby providing the thrust reverser system intermediate position.

Figure 8:
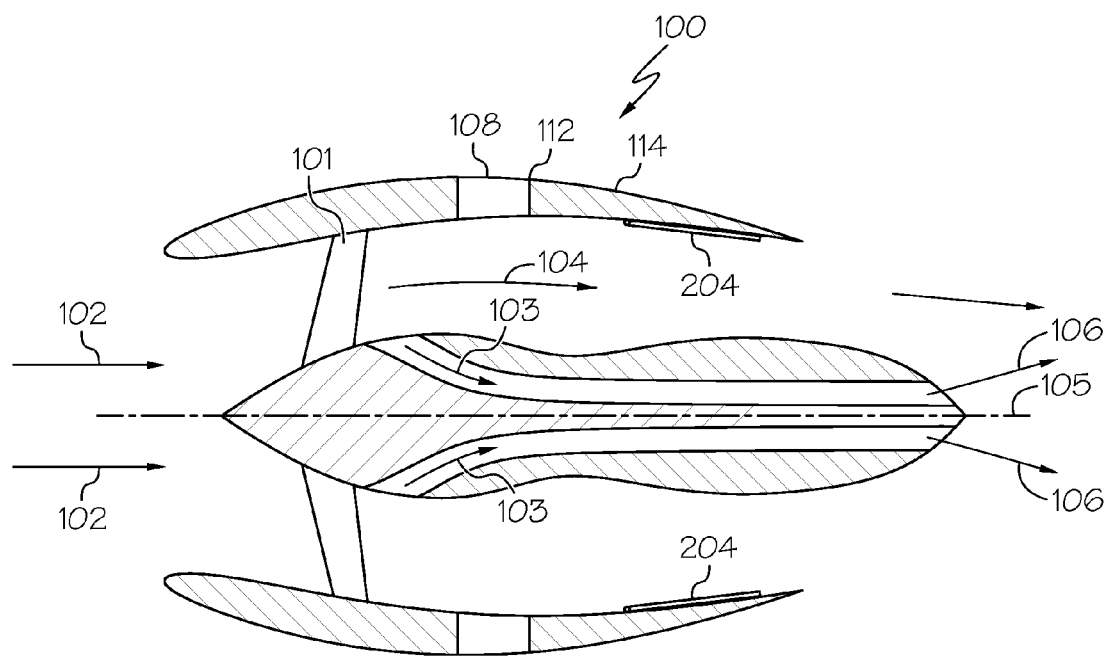
FIG. 8 and FIG. 9 are perspective views of a second variation of a typical aircraft turbofan engine with (i) a thrust reverser in a stowed position (FIG. 8), (ii) a thrust reverser in a deployed position (FIG. 8).
Figure 9:
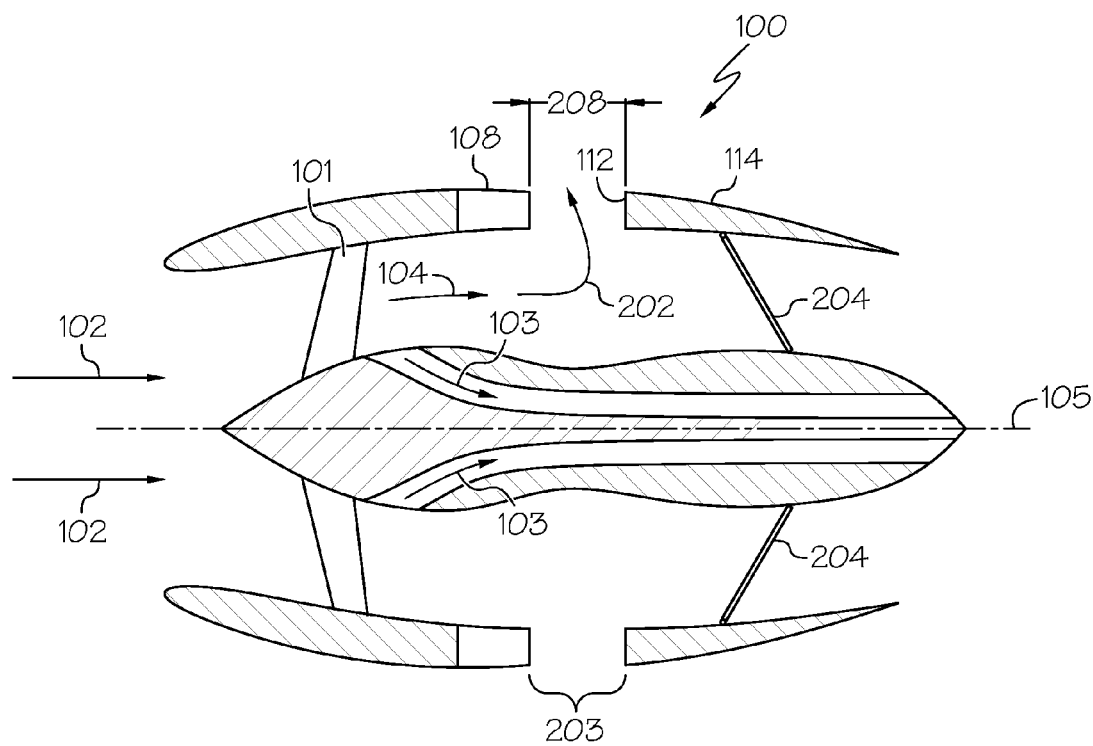

FIG. 8 and FIG. 9 are perspective views of a second variation of a typical aircraft turbofan engine with (i) a thrust reverser in a stowed position (FIG. 8), (ii) a thrust reverser in a deployed position (FIG. 9). The notable difference is that the displaceable blocker doors 204 deploy by closing to the core of the turbofan engine, rather than to an engine centerline. It may be readily appreciated that the above introduced novel concepts easily adapt to the variation of a typical aircraft turbofan engine depicted in FIG. 8 and FIG. 9, as well as other variations.

Thus there has been provided a system and method for reducing idle thrust in a translating cowl reverser system. The provided system and method provide a partial deployment, or thrust reverser system intermediate position for a translating cowl thrust reverser system. A person with skill in the art will readily appreciate that a variety of other embodiments may be utilized to provide the intended functionality without straying from the scope of the invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Some of the embodiments and implementations are described above in terms of functional and/or logical block components or modules. However, it should be appreciated that such block components (or modules) may be realized by any number of hardware, software, and/or firmware components configured to perform the specified functions. To clearly illustrate this interchangeability of hardware and software, these illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

What is claimed is:

1. A thrust reverser system for a turbofan engine, comprising:
    a stationary structure configured to be mounted to the turbofan engine;
    a transcowl mounted on the stationary structure and comprising a front edge, the transcowl configured for movement between a first position, in which the front edge abuts the stationary structure, and a second position, in which the transcowl is translated aft, thereby creating an aperture having a total deployment distance between the front edge and the stationary structure; and
    wherein the stationary structure has a support beam extending aft therefrom, the support beam having a pair of pivot joints providing a respective pair of pivot axes located aft of the total deployment distance from the stationary structure;
    a first displaceable blocker door and a second displaceable blocker door, the first and second displaceable blocker doors located aft of the total deployment distance aft of the stationary structure, the first and second displaceable blocker doors pivotally mounted to the support beam at respective one of the pair of pivot joints, the support beam and the first and second displaceable blocker doors being at least partially surrounded by the transcowl, the first and second displaceable blocker doors rotatable about a respective one of the pair of pivot axes and configured for pivoting between a stowed position and an aft-ward converging deployed position, the aft-ward converging deployed position defined as a trailing edge of the first displaceable blocker door and a trailing edge of the second displaceable blocker door closing together on an engine centerline to thereby direct turbofan engine airflow to discharge through the aperture to thereby generate reverse thrust;
    an actuation system coupled to the transcowl and the first and second displaceable blocker doors, the actuation system configured to coordinate transcowl movement with pivoting of the first and second displaceable blocker doors, thereby creating
    (i) a forward position, in which the transcowl is in the first position and the first and second displaceable blocker doors are in the stowed position,
    (ii) a reverse position, in which (a) the transcowl is in the second position and (b) the first and second displaceable blocker doors are in the aft-ward converging deployed position, and
    (iii) an intermediate position, in which (a) the transcowl is translated aft a predetermined distance that is less than the total deployment distance thereby creating a reduced aperture through which a portion of engine airflow discharges, and (b) the first and second displaceable blocker doors remain in the stowed position and aft of the total deployment distance aft of the stationary structure.

2. The thrust reverser system of claim 1, wherein the actuation system is configured to (i) move the transcowl aft the predetermined distance without causing the first and second displaceable blocker doors to pivot away from the stowed position, and (ii) synchronize pivoting of the first and second displaceable blocker doors with the transcowl movement such that the first and second displaceable blocker doors pivot between the stowed position and the aft-ward converging deployed position as the transcowl movement is between the intermediate position and the second position, respectively.

3. The thrust reverser system of claim 2, wherein the actuation system comprises:
a pair of linkage rods, each one of the pair of linkage rods comprising:
a first end and a second end, wherein the first end or the second end has a slot therethrough;
a first fastener; and
a second fastener; and
wherein a respective one of the pair of linkage rods is coupled on the first end to one of the first displaceable blocker door and the second displaceable blocker door by the first fastener and wherein the pair of linkage rods are coupled on their respective second end to the transcowl by the second fastener at a location that is aft of the total deployment distance aft of the stationary structure, and wherein one of the first fastener or second fastener is configured to travel within the slot of each one of the pair of linkage rods.

4. The thrust reverser system of claim 3, wherein the slot of each one of the pair of linkage rods is configured to permit transcowl movement between the first position and the intermediate position without pivoting the first and second displaceable blocker doors between the stowed position and the aft-ward converging deployed position.

5. The thrust reverser of claim 4, wherein:
the first and second displaceable blocker doors are among a plurality of displaceable blocker doors, the support beam is one of multiple support beams extending aft from the stationary structure, and each of the plurality of displaceable blocker doors is pivotally mounted aft of the total deployment distance aft of the stationary structure to one or more support beams and each are at least partially surrounded by the transcowl;
each one of the plurality of displaceable blocker doors is rotatable about a respective pivot axis and configured to be pivoted between a stowed position and an aft-ward converging deployed position when the transcowl moves between the first position and the second position, respectively; and
each one of the plurality of displaceable blocker doors is configured, when in the aft-ward converging deployed position, to redirect turbofan engine airflow through the aperture to thereby generate reverse thrust.

6. The thrust reverser system of claim 2, wherein the actuation system comprises:
a first compression spring coupled on a first end to the first displaceable blocker door and coupled on a second end to the transcowl; and
a second compression spring coupled on a first end to the second displaceable blocker door and coupled on a second end to the transcowl.

7. The thrust reverser system of claim 2, wherein the actuation system comprises:
a first rod comprising a first end and a second end, the first rod first end coupled to the transcowl;
a first lever arm having a first end and a second end, the first lever arm first end coupled to the second end of the first rod and the first lever arm second end coupled to the first displaceable blocker door;
a second rod comprising a first end and a second end, the second rod first end coupled to the transcowl; and
a second lever arm having a first end and a second end, the second lever arm first end coupled to the second end of the second rod and the second lever arm second end coupled to the second displaceable blocker door.

8. The thrust reverser system of claim 1, wherein the transcowl further comprises an inner surface having a contour formed therein to provide clearance for the first and second displaceable blocker doors as they pivot between the stowed position and the aft-ward converging deployed position.

9. The thrust reverser system of claim 1, wherein the predetermined distance is about 25% of the total deployment distance.

10. A method for producing a thrust reverser system for a turbofan engine, comprising:
mounting a stationary structure to the turbofan engine, the stationary structure having a support beam extending aft of the stationary structure, the support beam having a pair of pivot joints providing a respective pair of pivot axes;
mounting a transcowl on the stationary structure, the transcowl configured for movement between a first position, in which a front edge of the transcowl abuts the stationary structure, and a second position, in which the transcowl is translated aft a total deployment distance between the front edge and the stationary structure, thereby creating an aperture;
pivotally mounting a first displaceable blocker door and a second displaceable blocker door to a respective one of the pair of pivot joints on the support beam, wherein the first displaceable blocker door and the second displaceable blocker door are located aft of the total deployment distance aft of the stationary structure and rotatable about their respective pivot axes to pivot between a stowed position and an aft-ward converging deployed position, the aft-ward converging deployed position defined as a trailing edge of the first displaceable blocker door and a trailing edge of the second displaceable blocker door closing together on an engine centerline to thereby direct turbofan engine airflow to discharge through the aperture to thereby generate reverse thrust;
coupling an actuation system to the transcowl and to the first displaceable blocker door and the second displaceable blocker door;
coordinating, by the actuation system, transcowl movement with pivoting of the first and second displaceable blocker doors, thereby creating
(i) a forward position, in which the transcowl is abutted with the stationary structure and the first and second displaceable blocker doors are in the stowed position,
(ii) a reverse position, in which (a) the transcowl is translated aft the total deployment distance from the stationary structure, creating the aperture, and (b) the first and second displaceable blocker doors are in the aft-ward converging deployed position,
(iii) an intermediate position, in which (a) the transcowl is translated aft from the stationary structure by a predetermined distance that is less than the total deployment distance, thereby creating a reduced aperture through which a portion of engine airflow discharges, and (b) the first and second displaceable blocker doors remain in the stowed position and aft of the total deployment distance aft of the stationary structure.

11. The method of claim 10, further comprising:

moving the transcowl the predetermined distance without causing the first and second displaceable blocker doors to pivot away from the stowed position; and using the actuation system to synchronize pivoting of the first and second displaceable blocker doors with the transcowl movement such that the first and second displaceable blocker doors pivot between the stowed position and the aft-ward converging deployed position as the transcowl moves between the intermediate position and the reverse position, respectively.

* * * * *